United States Patent
Gower et al.

(10) Patent No.: US 7,480,759 B2
(45) Date of Patent: *Jan. 20, 2009

(54) SYSTEM, METHOD AND STORAGE MEDIUM FOR PROVIDING DATA CACHING AND DATA COMPRESSION IN A MEMORY SUBSYSTEM

(75) Inventors: Kevin C. Gower, LaGrangeville, NY (US); Mark W. Kellogg, Henrietta, NY (US); Warren E. Maule, Cedar Park, TX (US); Thomas B. Smith, III, Wilton, CT (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 11/772,922

(22) Filed: Jul. 3, 2007

(65) Prior Publication Data

US 2008/0016280 A1 Jan. 17, 2008

Related U.S. Application Data

(62) Division of application No. 10/977,846, filed on Oct. 29, 2004, now Pat. No. 7,277,988.

(51) Int. Cl.
*G06F 12/00* (2006.01)
(52) U.S. Cl. ............... 711/5; 711/3; 711/118; 711/119; 711/170
(58) Field of Classification Search ............ 711/3, 711/5, 118, 119, 170; 710/7, 20, 68, 100, 710/305
See application file for complete search history.

(56) References Cited

U.S. PATENT DOCUMENTS

| 2,842,682 A | 7/1958 | Clapper |
| 3,333,253 A | 7/1967 | Sahulka |
| 3,395,400 A | 7/1968 | De Witt |
| 3,825,904 A | 7/1974 | Burk et al. ............... 340/172.5 |
| 4,028,675 A | 6/1977 | Frankenberg ............... 711/106 |

(Continued)

FOREIGN PATENT DOCUMENTS

EP 0470734 A1 2/1992

(Continued)

OTHER PUBLICATIONS

PCT International Search Report PCT/EP2006/068984. Mailed Feb. 16, 2007.

(Continued)

*Primary Examiner*—Jack A Lane
(74) *Attorney, Agent, or Firm*—Cantor Colburn LLP; Lynn Augspurger

(57) ABSTRACT

A cascaded interconnect system including a memory controller, one or more memory modules, an upstream memory bus and a downstream memory bus. The one or more memory modules include a first memory module with cache data. The memory modules and the memory controller are interconnected by a packetized multi-transfer interface via the downstream memory bus and the upstream memory bus. The first memory module and the memory controller are in direct communication via the upstream memory bus and the downstream memory bus.

16 Claims, 13 Drawing Sheets

U.S. PATENT DOCUMENTS

| | | | |
|---|---|---|---|
| 4,135,240 A | 1/1979 | Ritchie | |
| 4,472,780 A | 9/1984 | Chenoweth et al. | |
| 4,475,194 A | 10/1984 | LaVallee et al. | 371/10 |
| 4,486,739 A | 12/1984 | Franaszek et al. | 340/347 |
| 4,641,263 A | 2/1987 | Perlman et al. | |
| 4,654,857 A | 3/1987 | Samson et al. | 371/68 |
| 4,723,120 A | 2/1988 | Petty, Jr. | 340/825.02 |
| 4,740,916 A | 4/1988 | Martin | 364/900 |
| 4,796,231 A | 1/1989 | Pinkham | 365/189.05 |
| 4,803,485 A | 2/1989 | Rypinkski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,985,828 A | 1/1991 | Shimizu et al. | 364/200 |
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | 365/52 |
| 5,517,626 A | 5/1996 | Archer et al. | |
| 5,522,064 A | 5/1996 | Aldereguia et al. | |
| 5,544,309 A | 8/1996 | Chang et al. | |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A | 1/1998 | Katta et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,325 A | 2/1999 | Nielsen et al. | 365/63 |
| 5,872,996 A | 2/1999 | Barth et al. | 395/853 |
| 5,917,780 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,011,732 A | 1/2000 | Harrison et al. | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | 712/230 |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | 711/170 |
| 6,185,718 B1 | 2/2001 | Dell et al. | |
| 6,215,686 B1 | 4/2001 | Deneroff et al. | 365/52 |
| 6,219,288 B1 | 4/2001 | Braceras et al. | |
| 6,219,760 B1 | 4/2001 | McMinn | |
| 6,260,127 B1 | 7/2001 | Olarig et al. | 711/167 |
| 6,262,493 B1 | 7/2001 | Garnett | |
| 6,292,903 B1 | 9/2001 | Coteus et al. | 713/401 |
| 6,301,636 B1 | 10/2001 | Schultz et al. | 711/108 |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,381,685 B2 | 4/2002 | Dell et al. | |
| 6,393,528 B1 | 5/2002 | Arimilli et al. | 711/137 |
| 6,408,398 B1 | 6/2002 | Frecker et al. | |
| 6,446,174 B1 | 9/2002 | Dow | |
| 6,467,013 B1 | 10/2002 | Nizar | |
| 6,473,836 B1 | 10/2002 | Ikeda | 711/137 |
| 6,483,755 B2 | 11/2002 | Leung et al. | 365/189.05 |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | 710/71 |
| 6,502,161 B1 | 12/2002 | Perego et al. | 711/5 |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | |
| 6,587,912 B2 | 7/2003 | Leddige et al. | |
| 6,590,827 B2 | 7/2003 | Chang et al. | |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | |
| 6,611,905 B1 | 8/2003 | Grundon et al. | 711/167 |
| 6,622,217 B2 | 9/2003 | Gharacorloo et al. | 711/141 |
| 6,625,687 B1 | 9/2003 | Halber et al. | 711/105 |
| 6,625,702 B2 | 9/2003 | Rentscler et al. | |
| 6,628,538 B2 | 9/2003 | Funaba et al. | 365/63 |
| 6,631,439 B2 | 10/2003 | Saulsbury et al. | |
| 6,671,376 B1 | 12/2003 | Koto et al. | 380/210 |
| 6,678,811 B2 | 1/2004 | Rentschler et al. | 711/167 |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,754,762 B1 | 6/2004 | Curley | |
| 6,766,389 B2 | 7/2004 | Hayter et al. | |
| 6,775,747 B2 | 8/2004 | Venkatraman | |
| 6,791,555 B1 | 9/2004 | Radke et al. | |
| 6,792,495 B1 | 9/2004 | Garney et al. | |
| 6,839,393 B1 | 1/2005 | Sidiropoulos | 375/371 |
| 6,877,076 B1 | 4/2005 | Cho et al. | |
| 6,877,078 B2 | 4/2005 | Fujiwara et al. | |
| 6,882,082 B2 | 4/2005 | Greeff et al. | |
| 6,889,284 B1 | 5/2005 | Nizar et al. | |
| 6,898,726 B1 | 5/2005 | Lee | |
| 6,918,068 B2 | 7/2005 | Vail et al. | |
| 6,938,119 B2 | 8/2005 | Kohn et al. | |
| 6,944,084 B2 | 9/2005 | Wilcox | |

| | | |
|---|---|---|
| 6,948,091 B2 | 9/2005 | Bartels et al. |
| 6,949,950 B2 | 9/2005 | Takahashi et al. |
| 6,977,536 B2 | 12/2005 | Chin-Chieh et al. ......... 327/116 |
| 6,993,612 B2 | 1/2006 | Porterfield |
| 7,039,755 B1 | 5/2006 | Helms |
| 7,047,384 B2 | 5/2006 | Bodas et al. |
| 7,076,700 B2 | 7/2006 | Rieger |
| 7,103,792 B2 | 9/2006 | Moon |
| 7,133,790 B2 | 11/2006 | Liou |
| 7,133,972 B2 | 11/2006 | Jeddeloh |
| 7,177,211 B2 | 2/2007 | Zimmerman |
| 7,194,593 B2 | 3/2007 | Schnepper |
| 7,197,594 B2 | 3/2007 | Raz et al. |
| 7,206,962 B2 | 4/2007 | Deegan et al. |
| 7,216,196 B2 | 5/2007 | Jeddeloh |
| 7,227,949 B2 | 6/2007 | Heegard et al. |
| 7,240,145 B2 | 7/2007 | Holman |
| 7,266,634 B2 | 9/2007 | Ware et al. |
| 7,313,583 B2 | 12/2007 | Porten et al. |
| 7,321,979 B2 | 1/2008 | Lee |
| 2001/0000822 A1 | 5/2001 | Dell et al. .................... 711/170 |
| 2001/0003839 A1 | 6/2001 | Kondo ........................ 711/144 |
| 2001/0029566 A1 | 10/2001 | Woo |
| 2002/0019926 A1 | 2/2002 | Huppenthal et al. ........... 712/15 |
| 2002/0038405 A1 | 3/2002 | Leddige et al. ............. 711/115 |
| 2002/0059439 A1 | 5/2002 | Arroyo et al. |
| 2002/0083255 A1 | 6/2002 | Greeff et al. ................ 710/305 |
| 2002/0103988 A1 | 8/2002 | Dornier ....................... 712/38 |
| 2002/0112119 A1 | 8/2002 | Halbert et al. .............. 711/115 |
| 2002/0112194 A1 | 8/2002 | Uzelac ....................... 713/500 |
| 2002/0124195 A1 | 9/2002 | Nizar ......................... 713/320 |
| 2002/0124201 A1 | 9/2002 | Edwards et al. |
| 2002/0147898 A1 | 10/2002 | Rentschler et al. .......... 711/170 |
| 2002/0174274 A1 | 11/2002 | Wu et al. .................... 710/100 |
| 2003/0009632 A1 | 1/2003 | Arimilli et al. |
| 2003/0028701 A1 | 2/2003 | Rao et al. |
| 2003/0033364 A1 | 2/2003 | Garnett et al. .............. 709/203 |
| 2003/0051055 A1 | 3/2003 | Parrella et al. |
| 2003/0056183 A1 | 3/2003 | Kobayashi |
| 2003/0084309 A1 | 5/2003 | Kohn ......................... 713/189 |
| 2003/0090879 A1 | 5/2003 | Doblar et al. ............... 361/728 |
| 2003/0105938 A1 | 6/2003 | Cooksey et al. |
| 2003/0126363 A1 | 7/2003 | David |
| 2003/0223303 A1 | 12/2003 | Lamb et al. ............ 365/230.06 |
| 2003/0236959 A1 | 12/2003 | Johnson et al. ............ 711/167 |
| 2004/0006674 A1 | 1/2004 | Hargis et al. ................ 711/156 |
| 2004/0049723 A1 | 3/2004 | Obara ........................ 714/729 |
| 2004/0098459 A1 | 5/2004 | Dorst |
| 2004/0098549 A1 | 5/2004 | Dorst |
| 2004/0117588 A1 | 6/2004 | Arimilli et al. ............. 711/203 |
| 2004/0128474 A1 | 7/2004 | Vorbach ..................... 712/10 |
| 2004/0163028 A1 | 8/2004 | Olarig |
| 2004/0165609 A1 | 8/2004 | Herbst et al. |
| 2004/0199363 A1 | 10/2004 | Bohizic et al. |
| 2004/0205433 A1 | 10/2004 | Gower et al. |
| 2004/0230718 A1 | 11/2004 | Polzin et al. .................. 710/22 |
| 2004/0246767 A1 | 12/2004 | Vogt ............................ 365/154 |
| 2004/0250153 A1 | 12/2004 | Vogt ............................ 713/500 |
| 2004/0260909 A1 | 12/2004 | Lee et al. |
| 2004/0260957 A1 | 12/2004 | Jeddeloh et al. |
| 2005/0023560 A1 | 2/2005 | Ahn et al. .................... 257/200 |
| 2005/0033906 A1 | 2/2005 | Mastronarde et al. |
| 2005/0044305 A1 | 2/2005 | Jakobs et al. |
| 2005/0050237 A1 | 3/2005 | Jeddeloh et al. ............... 710/10 |
| 2005/0050255 A1 | 3/2005 | Jeddeloh .................... 710/317 |
| 2005/0066136 A1 | 3/2005 | Schnepper .................. 711/154 |
| 2005/0071542 A1 | 3/2005 | Weber et al. |
| 2005/0080581 A1 | 4/2005 | Zimmerman et al. ........ 702/117 |
| 2005/0086411 A1 | 4/2005 | Myer et al. |
| 2005/0097249 A1 | 5/2005 | Oberlin et al. |
| 2005/0120157 A1 | 6/2005 | Chen et al. .................. 710/313 |
| 2005/0125702 A1 | 6/2005 | Huang et al. |
| 2005/0125703 A1 | 6/2005 | Lefurgy et al. |
| 2005/0138246 A1 | 6/2005 | Chen et al. |
| 2005/0138267 A1 | 6/2005 | Bains et al. |
| 2005/0144399 A1 | 6/2005 | Hosomi ..................... 711/145 |
| 2005/0149665 A1 | 7/2005 | Wolrich et al. |
| 2005/0166006 A1 | 7/2005 | Talbot et al. |
| 2005/0177677 A1 | 8/2005 | Jeddeloh |
| 2005/0177690 A1 | 8/2005 | LaBerge ..................... 711/154 |
| 2005/0204216 A1 | 9/2005 | Daily et al. ................. 714/724 |
| 2005/0223196 A1 | 10/2005 | Knowles |
| 2005/0229132 A1 | 10/2005 | Butt et al. ..................... 716/10 |
| 2005/0248997 A1 | 11/2005 | Lee |
| 2005/0257005 A1 | 11/2005 | Jeddeloh et al. |
| 2005/0259496 A1 | 11/2005 | Hsu et al. ................... 365/226 |
| 2005/0289377 A1 | 12/2005 | Luong |
| 2006/0036826 A1 | 2/2006 | Dell et al. |
| 2006/0036827 A1 | 2/2006 | Dell et al. |
| 2006/0080584 A1 | 4/2006 | Hartnett et al. |
| 2006/0085602 A1 | 4/2006 | Huggahalli et al. |
| 2006/0095592 A1 | 5/2006 | Borkenhagen |
| 2006/0095679 A1 | 5/2006 | Edirisooriya |
| 2006/0107175 A1 | 5/2006 | Dell et al. |
| 2006/0112238 A1 | 5/2006 | Jamil et al. |
| 2006/0161733 A1 | 7/2006 | Beckett et al. |
| 2006/0195631 A1 | 8/2006 | Rajamani |
| 2006/0288172 A1 | 12/2006 | Lee et al. |
| 2007/0025304 A1 | 2/2007 | Leelahakriengkrai et al. |
| 2007/0160053 A1 | 7/2007 | Coteus |

FOREIGN PATENT DOCUMENTS

| | | |
|---|---|---|
| GB | 2396711 A | 6/2004 |
| JP | 59153353 | 9/1984 |
| JP | 59153353 A | 9/1984 |
| JP | 0432614 | 11/1992 |
| JP | 10011971 | 1/1998 |
| WO | WO2005038660 | 4/2005 |

OTHER PUBLICATIONS

PCT International Searh Report PCT/EP2007/057916. Mailed Dec. 14, 2007.

International Search Report, International Application No. PCT/EP2007/054929, International Publication No. WO 2007/135144 A1, received Mar. 21, 2008.

Luca Benini, et al., "System-Level Powers Optimization: Techniques and Tools", ACM Transactions on Design Automation of Electronic Systems, vol. 5, No. 2, Apr. 2000, pp. 115-192.

Boudon, et al., "Novel Bus Reconfiguration Scheme with Spare Lines", IBM Technical Disclosure Bulletin, May 1987, vol. 29, No. 12, pp. 1-3.

Brown, et al "Compiler-Based I/O Prefetching for Out-of-Core Applications", ACM Transactions on Computer Systems, vol. 19, No. 2, May 2001, pp. 111-170.

Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.

JEDEC Solid State Technology Association, "JEDEC Standard: DDR2 SDRAM Specification",Jan. 2004, JEDEC, Revision JESD79-2A, p. 10.

Jungjoon Kim et al.; "Performance and Architecture Features of Segmented Multiple Bus System;" IEEE Computer Society; 1999 International Conference on Parallel Processing (ICPP '99).

Massoud Pedram, "Power Minimization in IC Design Principles and Applications", ACM Transactions on Design Automation of Electronic Systems vol. 1, No. 1, Jan. 1996, pp. 3-56.

Natarajan, et al., "A Study of Performance Impact of Memory Controller Features in Multi-Processor Server Environment", pp. 80-87.

NB940259 (IBM Technical Disclosure Bulletin, Feb. 1994; vol. 37; pp. 59-64.

Nilsen, "High-Level Dynamic Memory Management for Object-Oriented Real-Time Systems", pp. 86-93.

P.R. Panda, "Data and Memory Optimization Techniques For Embedded Systems", ACM Transactions on Design Automation of Electronic Systems, vol. 6, No. 2, Apr. 2001, pp. 149-206.

Penrod, Lee, "Understanding System Memory and CPU Speeds: A laymans guide to the Front Side Bus (FSB)", Dec. 28, 2005, Direction . Org, pp. 1-5, http://www.directron.com/direction/fsbguide.html. [online] [retrieved on Feb. 23, 2006]; retrieved from the Internet.

Seceleanu et al.; "Segment Arbiter as Action System;" IEEE 2003 pp. 249-252.

Singh, S., et al., "Bus Sparing for Fault-Tolerant System Design", IBM Technical Disclosure Bulletin, Dec. 1991, vol. 34, No. 71, pp. 117-118.

Sivencrona et al.; "RedCAN™; Simulations of two Fault Recovery Algorithms for CAN;" Proceedings for the 10th IEEE Pacific Rim International Symposium on Dependable Computing (PRDC'04); 2005.

U.S. Appl. No. 11/419,586, filed May 22, 2006. Robert Tremaine. "Systems and Methods for Providing Remote Pre-Fetch Buffers".

Wang, et al., "Guided Region Prefetching: A Cooperative Hardware/Software Approach", pp. 388-398.

Wikipedia, Serial Communications, [online], [retrieved Apr. 10, 2007 from the Internet], http://en.wikipedia.org/wiki/Serial_communications,p. 1.

IEEE, "IEEE Standard Test Access Port and Boundary-Scan Architecture", Jul. 23, 2001, IEEE Std 1149-1-2001, pp. 11-13.

Rosenberg, "Dictionary of Computers, Information Processing & Telecommunications", Second Edition, John Wiley & Sons, Inc. 1987. 3 pgs.

PCT Search Report. PCT/EP2007/057915. Mailed Nov. 7, 2007.

SYSTEM, METHOD AND STORAGE MEDIUM FOR PROVIDING DATA CACHING AND DATA COMPRESSION IN A MEMORY SUBSYSTEM

CROSS REFERENCE TO RELATED APPLICATION

This application is a divisional application of U.S. Ser. No. 10/977,846 filed Oct. 29, 2004, now U.S. Pat. No. 7,277,988, the contents of which are incorporated by reference herein in their entirety.

BACKGROUND OF THE INVENTION

The invention relates to a memory subsystem and, in particular, to providing data caching and data compression in a memory subsystem.

Computer memory subsystems have evolved over the years, but continue to retain many consistent attributes. Computer memory subsystems from the early 1980's, such as the one disclosed in U.S. Pat. No. 4,475,194 to LaVallee et al., of common assignment herewith, included a memory controller, a memory assembly (contemporarily called a basic storage module (BSM) by the inventors) with array devices, buffers, terminators and ancillary timing and control functions, as well as several point-to-point busses to permit each memory assembly to communicate with the memory controller via its own point-to-point address and data bus. FIG. 1 depicts an example of this early 1980 computer memory subsystem with two BSMs, a memory controller, a maintenance console, and point-to-point address and data busses connecting the BSMs and the memory controller.

FIG. 2, from U.S. Pat. No. 5,513,135 to Dell et al., of common assignment herewith, depicts an early synchronous memory module, which includes synchronous dynamic random access memories (DRAMs) 8, buffer devices 12, an optimized pinout, an interconnect and a capacitive decoupling method to facilitate operation. The patent also describes the use of clock re-drive on the module, using such devices as phase lock loops (PLLs).

FIG. 3, from U.S. Pat. No. 6,510,100 to Grundon et al., of common assignment herewith, depicts a simplified diagram and description of a memory system 10 that includes up to four registered dual inline memory modules (DIMMs) 40 on a traditional multi-drop stub bus channel. The subsystem includes a memory controller 20, an external clock buffer 30, registered DIMMs 40, an address bus 50, a control bus 60 and a data bus 70 with terminators 95 on the address bus 50 and data bus 70.

FIG. 4 depicts a 1990's memory subsystem which evolved from the structure in FIG. 1 and includes a memory controller 402, one or more high speed point-to-point channels 404, each connected to a bus-to-bus converter chip 406, and each having a synchronous memory interface 408 that enables connection to one or more registered DIMMs 410. In this implementation, the high speed, point-to-point channel 404 operated at twice the DRAM data rate, allowing the bus-to-bus converter chip 406 to operate one or two registered DIMM memory channels at the full DRAM data rate. Each registered DIMM included a PLL, registers, DRAMs, an electrically erasable programmable read-only memory (EEPROM) and terminators, in addition to other passive components.

As shown in FIG. 5, memory subsystems were often constructed with a memory controller connected either to a single memory module, or to two or more memory modules interconnected on a 'stub' bus. FIG. 5 is a simplified example of a multi-drop stub bus memory structure, similar to the one shown in FIG. 3. This structure offers a reasonable tradeoff between cost, performance, reliability and upgrade capability, but has inherent limits on the number of modules that may be attached to the stub bus. The limit on the number of modules that may be attached to the stub bus is directly related to the data rate of the information transferred over the bus. As data rates increase, the number and length of the stubs must be reduced to ensure robust memory operation. Increasing the speed of the bus generally results in a reduction in modules on the bus with the optimal electrical interface being one in which a single module is directly connected to a single controller, or a point-to-point interface with few, if any, stubs that will result in reflections and impedance discontinuities. As most memory modules are sixty-four or seventy-two bits in data width, this structure also requires a large number of pins to transfer address, command, and data. One hundred and twenty pins are identified in FIG. 5 as being a representative pincount.

FIG. 6, from U.S. Pat. No. 4,723,120 to Petty, of common assignment herewith, is related to the application of a daisy chain structure in a multipoint communication structure that would otherwise require multiple ports, each connected via point-to-point interfaces to separate devices. By adopting a daisy chain structure, the controlling station can be produced with fewer ports (or channels), and each device on the channel can utilize standard upstream and downstream protocols, independent of their location in the daisy chain structure.

FIG. 7 represents a daisy chained memory bus, implemented consistent with the teachings in U.S. Pat. No. 4,723,120. A memory controller 111 is connected to a memory bus 315, which further connects to a module 310*a*. The information on bus 315 is re-driven by the buffer on module 310*a* to a next module, 310*b*, which further re-drives the bus 315 to module positions denoted as 310*n*. Each module 310*a* includes a DRAM 311*a* and a buffer 320*a*. The bus 315 may be described as having a daisy chain structure with each bus being point-to-point in nature.

One drawback to the use of a daisy chain bus is associated with providing enhanced capabilities such as data caching and data compression. Adding enhanced capabilities may result in an indeterminate read data latency because the amount of time required to read a particular item of data cannot be pre-determined by the memory controller. The read latency will depend on several varying factors such as whether the data is located in a cache and whether the data has to be decompressed before being returned to the memory controller. However, the ability to add data caching and/or data compression in a pluggable fashion to selected modules in a daisy chain bus is desirable because these enhanced capabilities may lead to improved performance and space savings within a memory subsystem.

BRIEF SUMMARY OF THE INVENTION

Exemplary embodiments of the present invention include a cascaded interconnect system including a memory controller, one or more memory modules, an upstream memory bus and a downstream memory bus. The one or more memory modules include a first memory module with cache data. The memory modules and the memory controller are interconnected by a packetized multi-transfer interface via the downstream memory bus and the upstream memory bus. The first memory module and the memory controller are in direct communication via the upstream memory bus and the downstream memory bus.

Another exemplary embodiment of the present invention includes a memory controller, one or more memory modules, an upstream memory bus and a downstream memory bus. The one or more memory modules each include memory modules a plurality of corresponding memory devices. At least one of the memory modules includes cache data sourced from the corresponding memory devices on the memory module and a cache directory corresponding to the cache data. The memory modules and the memory controller are interconnected by a packetized multi-transfer interface via the downstream memory bus and the upstream memory bus. In addition, the memory controller utilizes a read data tag on data read requests sent via the downstream memory bus and the read data tag on data return results received via the upstream memory bus to match the data read requests with the data return results.

Another exemplary embodiment of the present invention includes a memory controller, one or more memory modules, an upstream memory bus and a downstream memory bus. The one or more memory modules include a first memory module with a data compression module for compressing and decompressing data stored on the memory modules. The memory modules and the memory controller are interconnected by a packetized multi-transfer interface via the downstream memory bus and the upstream memory bus. The first memory module and the memory controller are in direct communication via the upstream memory bus and the downstream memory bus.

A further exemplary embodiment of the present invention includes a cascaded interconnect system with a memory controller, one or more memory modules, an upstream memory bus and a downstream memory bus. The one or more memory modules each include a plurality of corresponding memory devices and at least one of the memory modules includes a data compression module. The memory modules and the memory controller are interconnected by a packetized multi-transfer interface via the downstream memory bus and the upstream memory bus. In addition, the memory controller utilizes a read data tag on data read requests sent via the downstream memory bus and the read data tag on data return results received via the upstream memory bus to match the data read requests with the data return results.

A further exemplary embodiment of the present invention includes a method for providing data caching in a memory system. The method includes receiving a request at a selected memory module to read data at a specified data address. The request is from a memory controller in a cascaded memory system and the selected memory module is one of one or more memory modules included in the cascaded memory system. A cache directory is searched for the data address. The data is read from cache data in response to locating the data address in the cache directory. The data is read from one of the memory devices in response to not locating the data address in the cache directory. The data is transmitted to the memory controller.

A further exemplary embodiment of the present invention includes a method for providing data compression in a memory system. The method includes receiving a request at a selected memory module to read data at a specified data address. The request comes from a memory controller in a cascaded memory system and the selected memory module is one of one or more memory modules included in the cascaded memory system. It is determined if the data is compressed and the data is decompressed if it is determined to be compressed. The data is then transmitted to the memory controller.

A further exemplary embodiment of the present invention includes a storage medium encoded with machine readable computer program code for providing data caching in a memory subsystem. The storage medium includes instructions for causing a computer to implement a method. The method includes receiving a request at a selected memory module to read data at a specified data address. The request is from a memory controller in a cascaded memory system and the selected memory module is one of one or more memory modules included in the cascaded memory system. A cache directory is searched for the data address. The data is read from cache data in response to locating the data address in the cache directory. The data is read from one of the memory devices in response to not locating the data address in the cache directory. The data is transmitted to the memory controller.

A further exemplary embodiment of the present invention includes a storage medium encoded with machine readable computer program code for providing data compression in a memory subsystem. The storage medium includes instructions for causing a computer to implement a method. The method includes receiving a request at a selected memory module to read data at a specified data address. The request comes from a memory controller in a cascaded memory system and the selected memory module is one of one or more memory modules included in the cascaded memory system. It is determined if the data is compressed and the data is decompressed if it is determined to be compressed. The data is then transmitted to the memory controller.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments of the present invention provide an enhanced memory subsystem (or memory channel) by including data caching capability in one or more memory modules within a cascaded memory subsystem. In embodiments where the memory controller has access to a cache directory for the memory subsystem, the deterministic nature of the controller interface protocol utilized by the memory subsystem is preserved. When the memory controller has access to the cache directory, reads to the cache data can be predetermined and specifically requested by the memory controller. Thus, the read data return from such reads to the cache data may be scheduled using standard mechanisms.

Additional embodiments of the present invention provide for a memory subsystem where the cache directory does not reside in the memory controller and is not accessible by the memory controller. In this case, the addition of cache to the memory subsystem results in indeterminate read data latencies. A tag signal is added to the upstream controller interface frame format so that returned read data may be identified by the memory controller. This read data identification removes the requirement that the memory controller be able to predict the exact return time of each read request. The ability to handle indeterminate read data latency allows the memory modules in the memory channel to utilize enhanced features (e.g., data caching and data compression) that modify the normally predictable read data return times.

Figure 4:
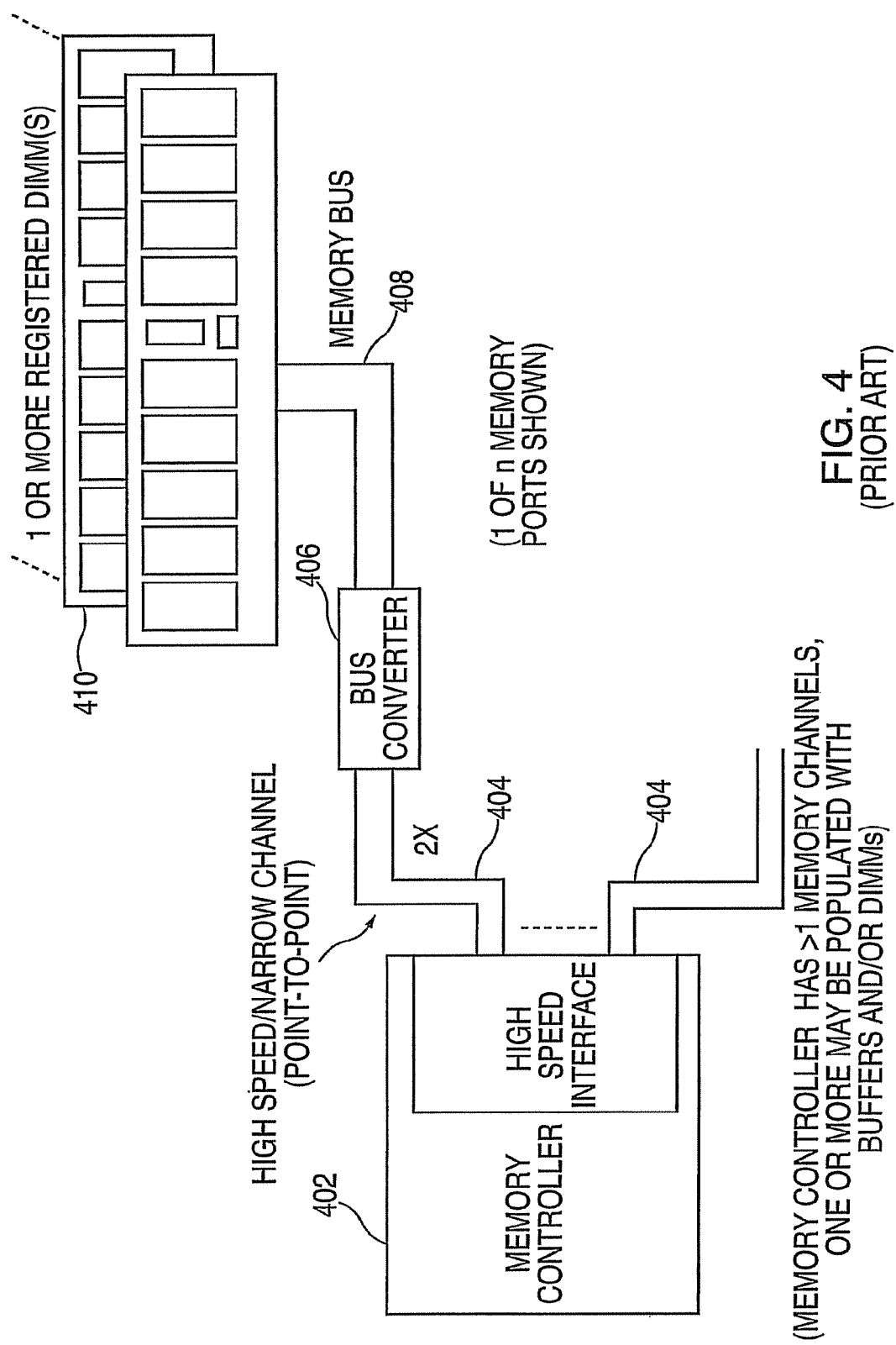
FIG. 4 depicts a prior art memory subsystem with point-to-point channels, registered DIMMs, and a 2:1 bus speed multiplier.
Figure 5:
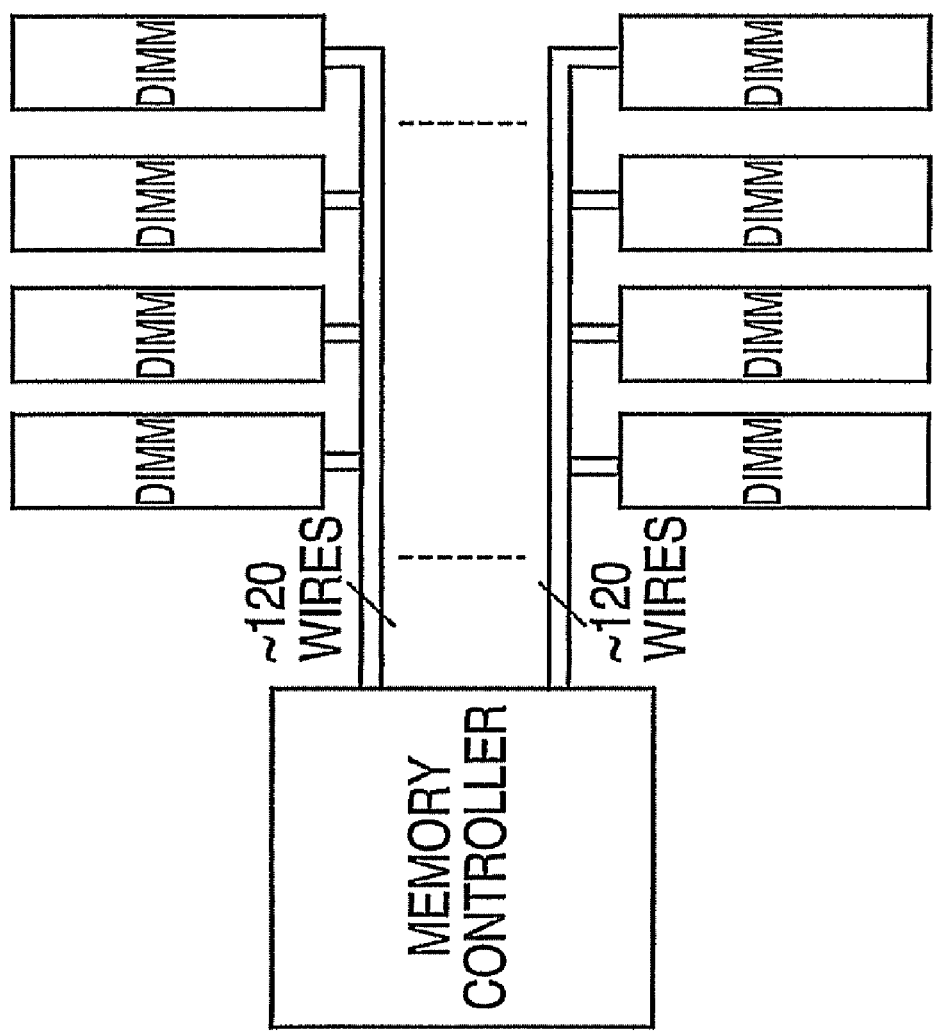
FIG. 5 depicts a prior art memory structure that utilizes a multidrop memory 'stub' bus.
Figure 6:
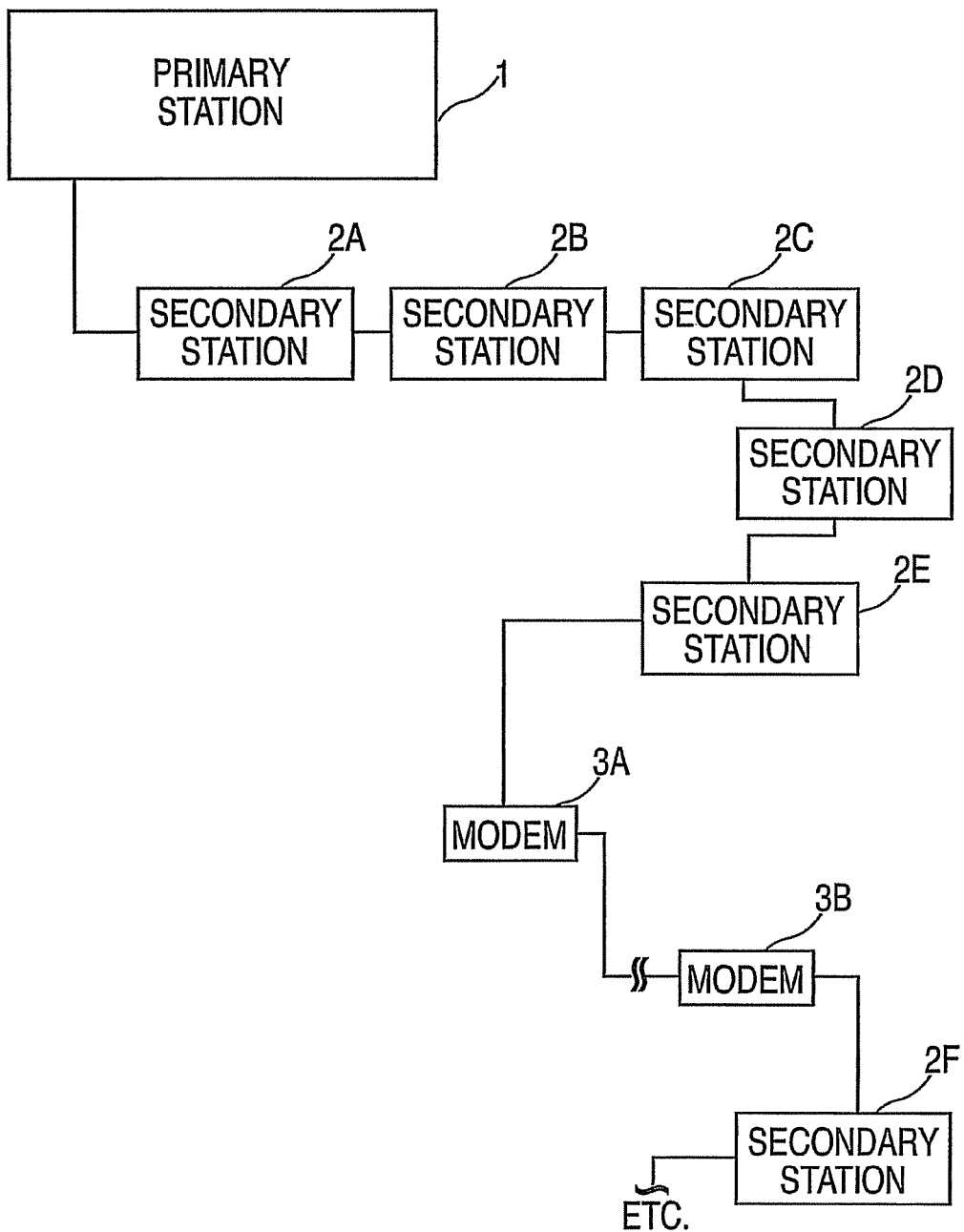
FIG. 6 depicts a prior art daisy chain structure in a multi-point communication structure that would otherwise require multiple ports.
Figure 7:
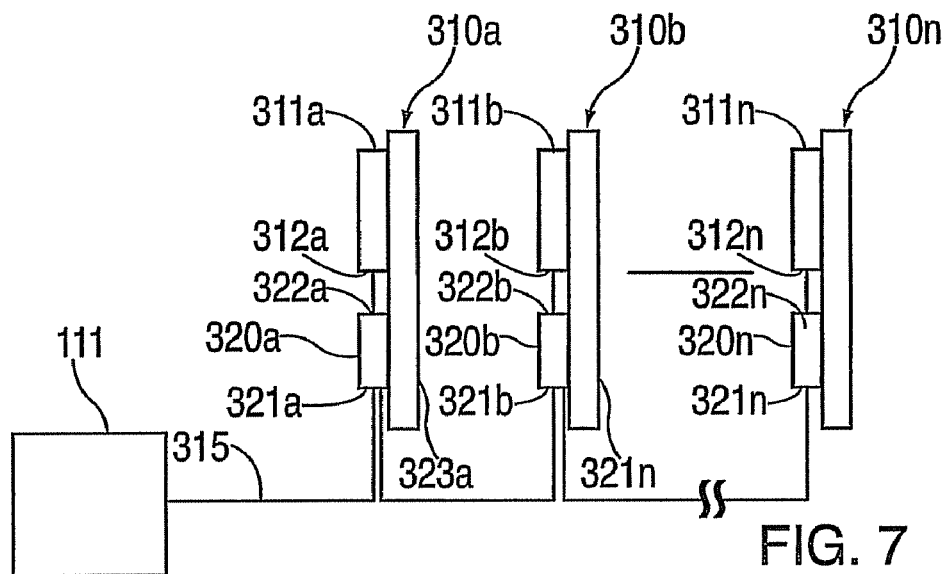
FIG. 7 depicts a prior art daisy chain connection between a memory controller and memory modules.
Figure 8:
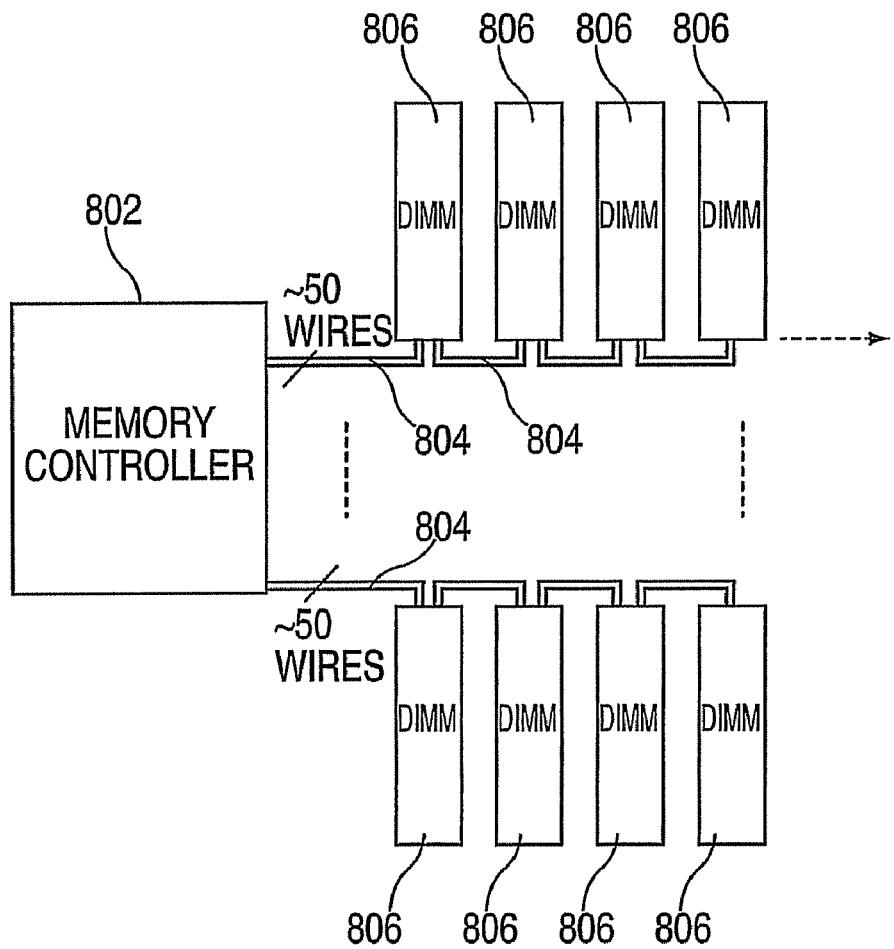
FIG. 8 depicts a cascaded memory structure that is utilized by exemplary embodiments of the present invention.

FIG. 8 depicts a cascaded memory structure that may be utilized by exemplary embodiments of the present invention when buffered memory modules 806 (e.g., the buffer device is included within the memory module 806) are in communication with a memory controller 802. This memory structure includes the memory controller 802 in communication with one or more memory modules 806 via a high speed point-to-point bus 804. Each bus 804 in the exemplary embodiment depicted in FIG. 8 includes approximately fifty high speed wires for the transfer of address, command, data and clocks. By using point-to-point busses as described in the aforementioned prior art, it is possible to optimize the bus design to permit significantly increased data rates, as well as to reduce the bus pincount by transferring data over multiple cycles. Whereas FIG. 4 depicts a memory subsystem with a two to one ratio between the data rate on any one of the busses connecting the memory controller to one of the bus converters (e.g., to 1,066 Mb/s per pin) versus any one of the busses between the bus converter and one or more memory modules (e.g., to 533 Mb/s per pin), an exemplary embodiment of the present invention, as depicted in FIG. 8, provides a four to one bus speed ratio to maximize bus efficiency and to minimize pincount.

Although point-to-point interconnects permit higher data rates, overall memory subsystem efficiency must be achieved by maintaining a reasonable number of memory modules 806 and memory devices per channel (historically four memory modules with four to thirty-six chips per memory module, but as high as eight memory modules per channel and as few as one memory module per channel). Using a point-to-point bus necessitates a bus re-drive function on each memory module to permit memory modules to be cascaded such that each memory module is interconnected to other memory modules, as well as to the memory controller 802.

Figure 9:
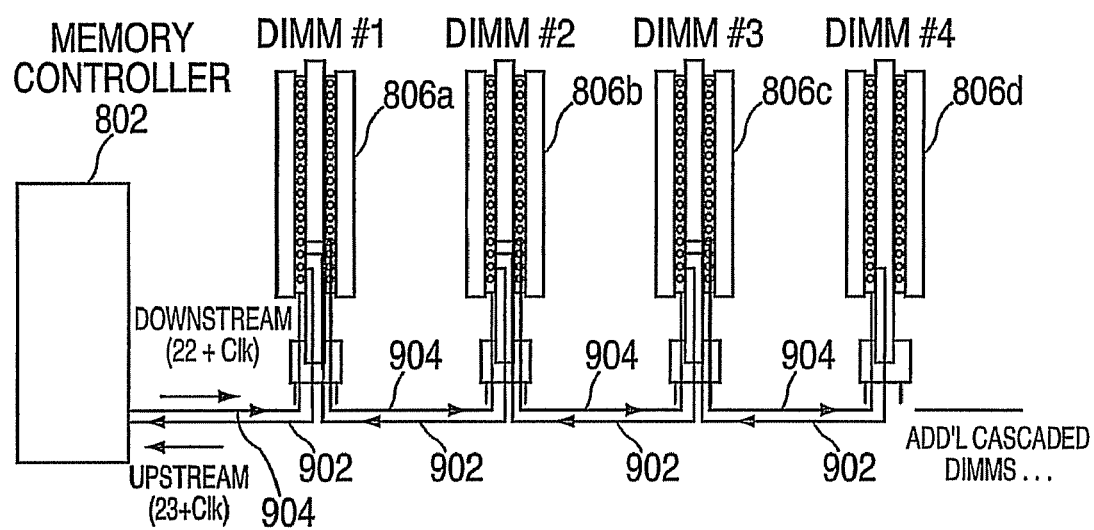
FIG. 9 depicts a memory structure with cascaded memory modules and unidirectional busses that is utilized by exemplary embodiments of the present invention.

FIG. 9 depicts a memory structure with cascaded memory modules and unidirectional busses that is utilized by exemplary embodiments of the present invention. One of the functions provided by the memory modules 806 in the cascade structure is a re-drive function to send signals on the memory bus to other memory modules 806 or to the memory controller 802. FIG. 9 includes the memory controller 802 and four memory modules 806a, 806b, 806c and 806d, on each of two memory busses (a downstream memory bus 904 and an upstream memory bus 902), connected to the memory controller 802 in either a direct or cascaded manner. Memory module 806a is connected to the memory controller 802 in a direct manner. Memory modules 806b, 806c and 806d are connected to the memory controller 802 in a cascaded manner.

An exemplary embodiment of the present invention includes two unidirectional busses between the memory controller 802 and memory module 806a ("DIMM #1"), as well as between each successive memory module 806b-d ("DIMM #2", "DIMM #3" and "DIMM #4") in the cascaded memory structure. The downstream memory bus 904 is comprised of twenty-two single-ended signals and a differential clock pair. The downstream memory bus 904 is used to transfer address, control, write data and bus-level error code correction (ECC) bits downstream from the memory controller 802, over several clock cycles, to one or more of the memory modules 806 installed on the cascaded memory channel. The upstream memory bus 902 is comprised of twenty-three single-ended signals and a differential clock pair, and is used to transfer read data and bus-level ECC bits upstream from the sourcing memory module 806 to the memory controller 802. Because the upstream memory bus 902 and the downstream memory bus 904 are unidirectional and operate independently, read data, write data and memory commands may be transmitted simultaneously. This increases effective memory subsystem bandwidth and may result in higher system performance. Using this memory structure, and a four to one data rate multiplier between the DRAM data rate (e.g., 400 to 800 Mb/s per pin) and the unidirectional memory bus data rate (e.g., 1.6 to 3.2 Gb/s per pin), the memory controller 802 signal pincount, per memory channel, is reduced from approximately one hundred and twenty pins to about fifty pins.

Figure 10:
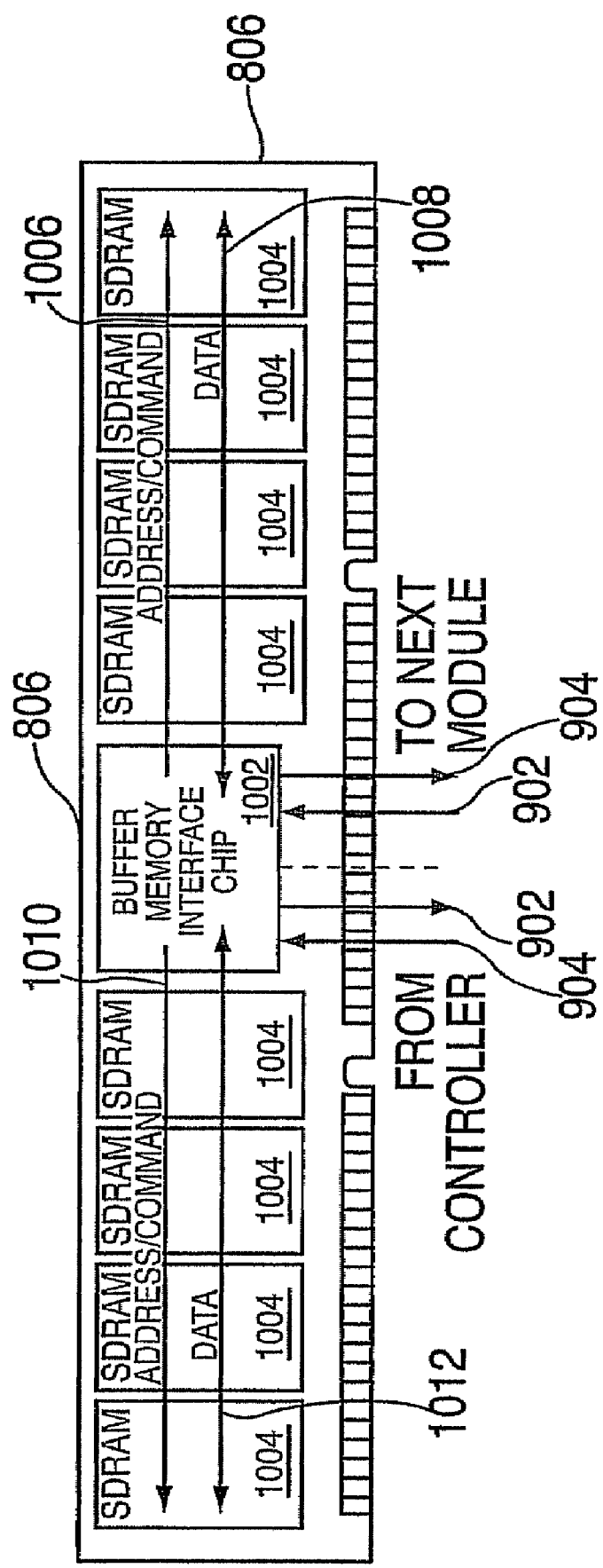
FIG. 10 depicts a buffered module wiring system that is utilized by exemplary embodiments of the present invention.

FIG. 10 depicts a buffered module wiring system that is utilized by exemplary embodiments of the present invention. FIG. 10 is a pictorial representation of a memory module with shaded arrows representing the primary signal flows. The signal flows include the upstream memory bus 902, the downstream memory bus 904, memory device address and command busses 1010 and 1006, and memory device data busses 1012 and 1008. In an exemplary embodiment of the present invention, a buffer device 1002, also referred to as a memory interface chip, provides two copies of the address and command signals to the SDRAMs 1004 with the right memory device address and command bus 1006 exiting from the right side of the buffer device 1002 for the SDRAMs 1004 located to the right side and behind the buffer device 1002 on the right. The left memory device address and command bus 1010 exits from the left side of the buffer device 1002 and connects to the SDRAMs 1004 to the left side and behind the buffer device 1002 on the left. Similarly, the data bits intended for SDRAMs 1004 to the right of the buffer device 1002 exit from the right of the buffer device 1002 on the right memory device data bus 1008. The data bits intended for the left side of the buffer device 1002 exit from the left of the buffer device 1002 on the left memory device data bus 1012. The high speed upstream memory bus 902 and downstream memory bus 904 exit from the lower portion of the buffer device 1002, and connect to a memory controller or other memory modules either upstream or downstream of this memory module 806, depending on the application. The buffer device 1002 receives signals that are four times the memory module data rate and converts them into signals at the memory module data rate.

The memory controller 802 interfaces to the memory modules 806 via a pair of high speed busses (or channels). The downstream memory bus 904 (outbound from the memory controller 802) interface has twenty-four pins and the upstream memory bus 902 (inbound to the memory controller 802) interface has twenty-five pins. The high speed channels each include a clock pair (differential), a spare bit lane, ECC syndrome bits and the remainder of the bits pass information (based on the operation underway). Due to the cascaded memory structure, all nets are point-to-point, allowing reliable high-speed communication that is independent of the number of memory modules 806 installed. Whenever a memory module 806 receives a packet on either bus, it re-synchronizes the command to the internal clock and re-drives the command to the next memory module 806 in the chain (if one exists).

As described previously, the memory controller 802 interfaces to the memory module 806 via a pair of high speed channels (i.e., the downstream memory bus 904 and the upstream memory bus 902). The downstream (outbound from the memory controller 802) interface has twenty-four pins and the upstream (inbound to the memory controller 802) has twenty-five pins. The high speed channels each consist of a clock pair (differential), as well as single ended signals. Due to the cascade memory structure, all nets are point to point, allowing reliable high-speed communication that is independent of the number of memory modules 806 installed. The differential clock received from the downstream interface is used as the reference clock for the buffer device PLL and is therefore the source of all local buffer device 1002 clocks. Whenever the memory module 806 receives a packet on either bus, it re-synchronizes it to the local clock and drives it to the next memory module 806 or memory controller 802, in the chain (if one exists).

Figure 1:
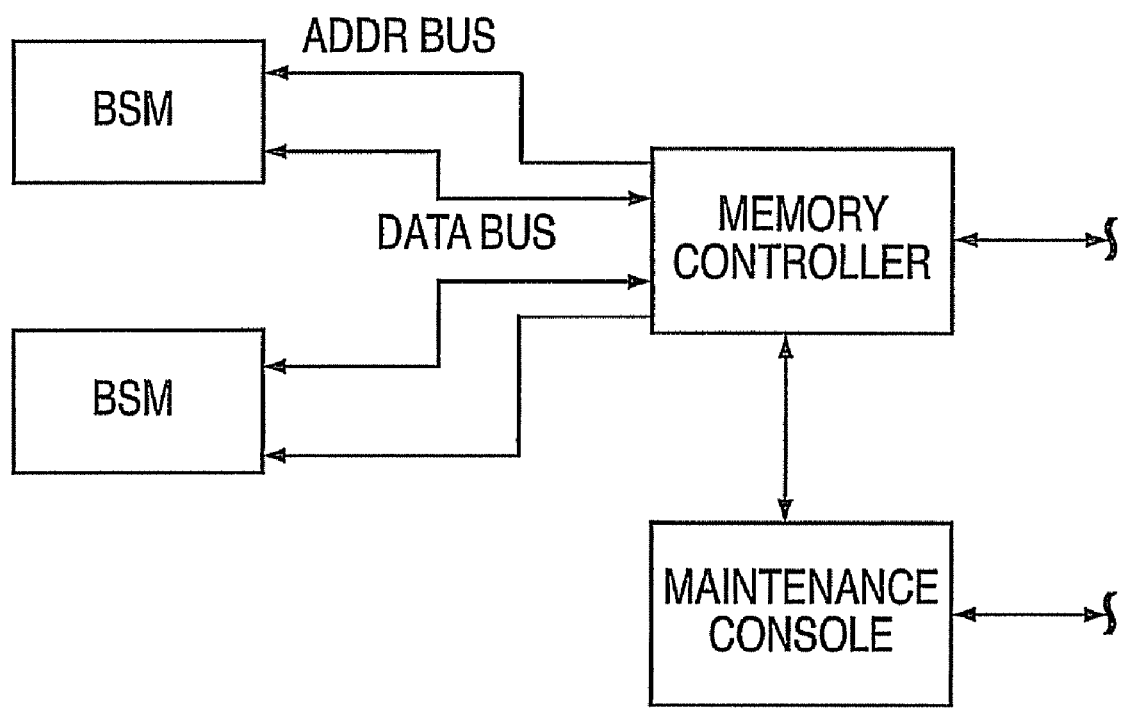
FIG. 1 depicts a prior art memory controller connected to two buffered memory assemblies via separate point-to-point links.
Figure 2:
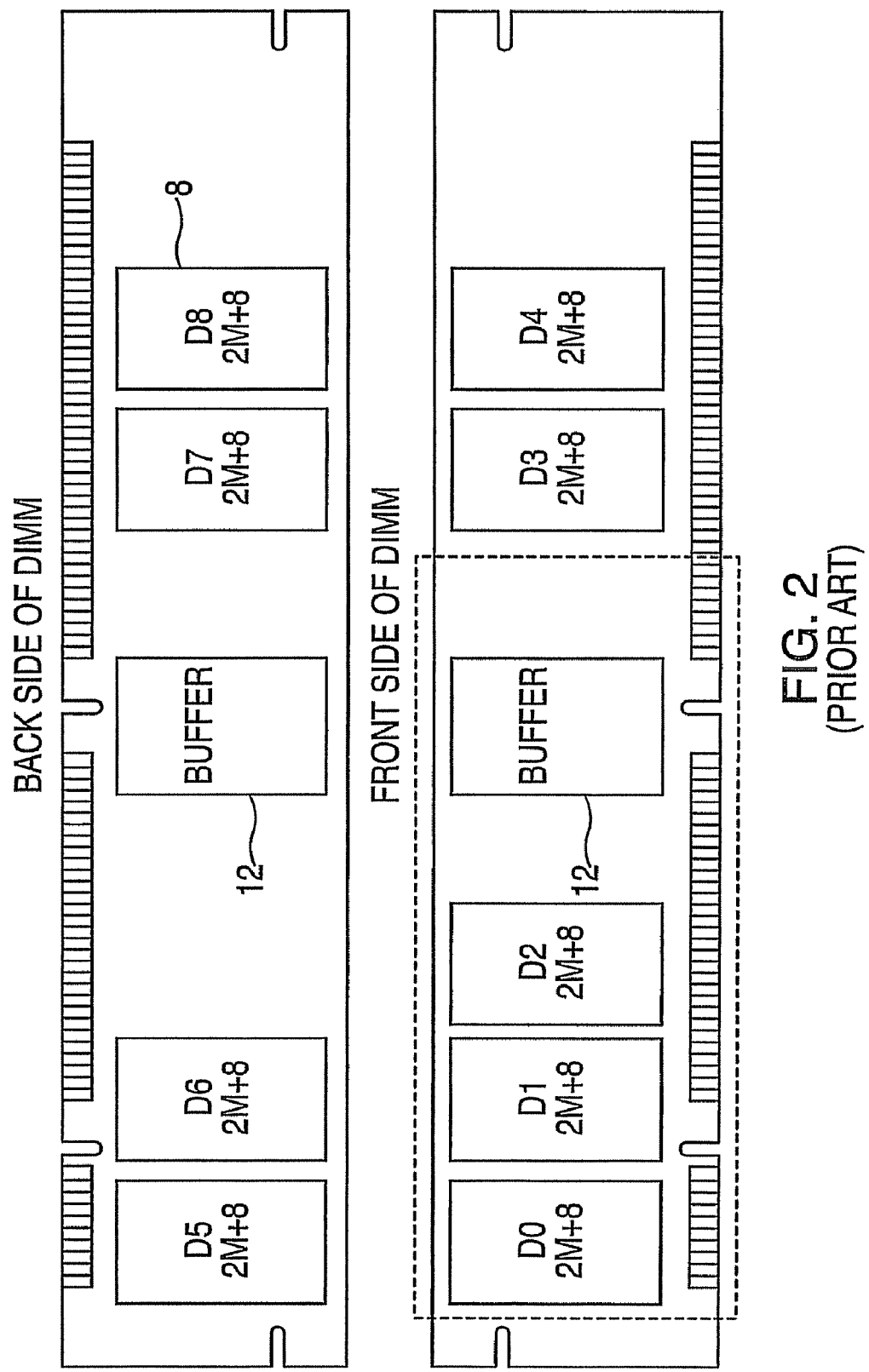
FIG. 2 depicts a prior art synchronous memory module with a buffer device.
Figure 3:
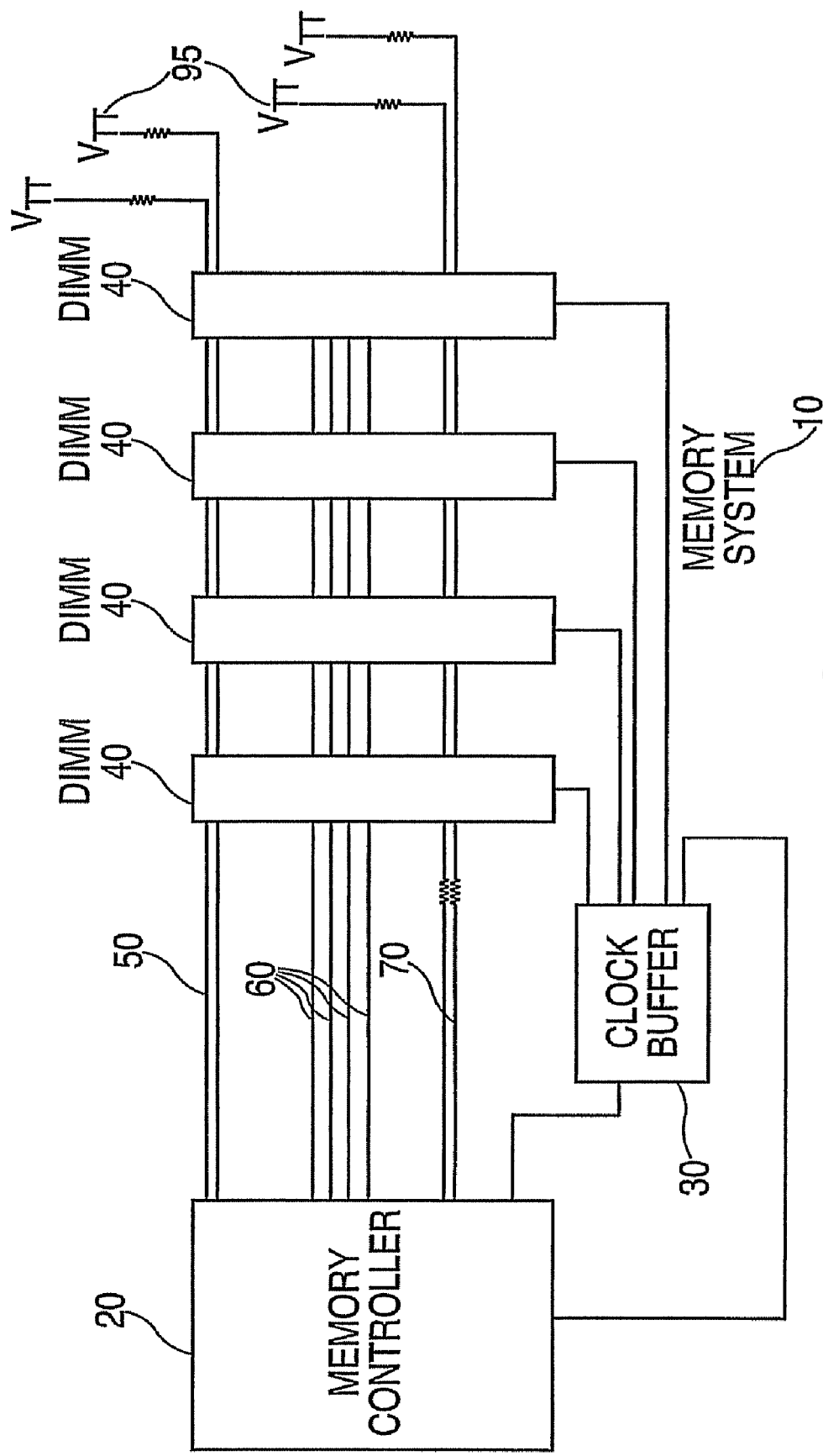
FIG. 3 depicts a prior art memory subsystem using registered DIMMs.
Figure 11:
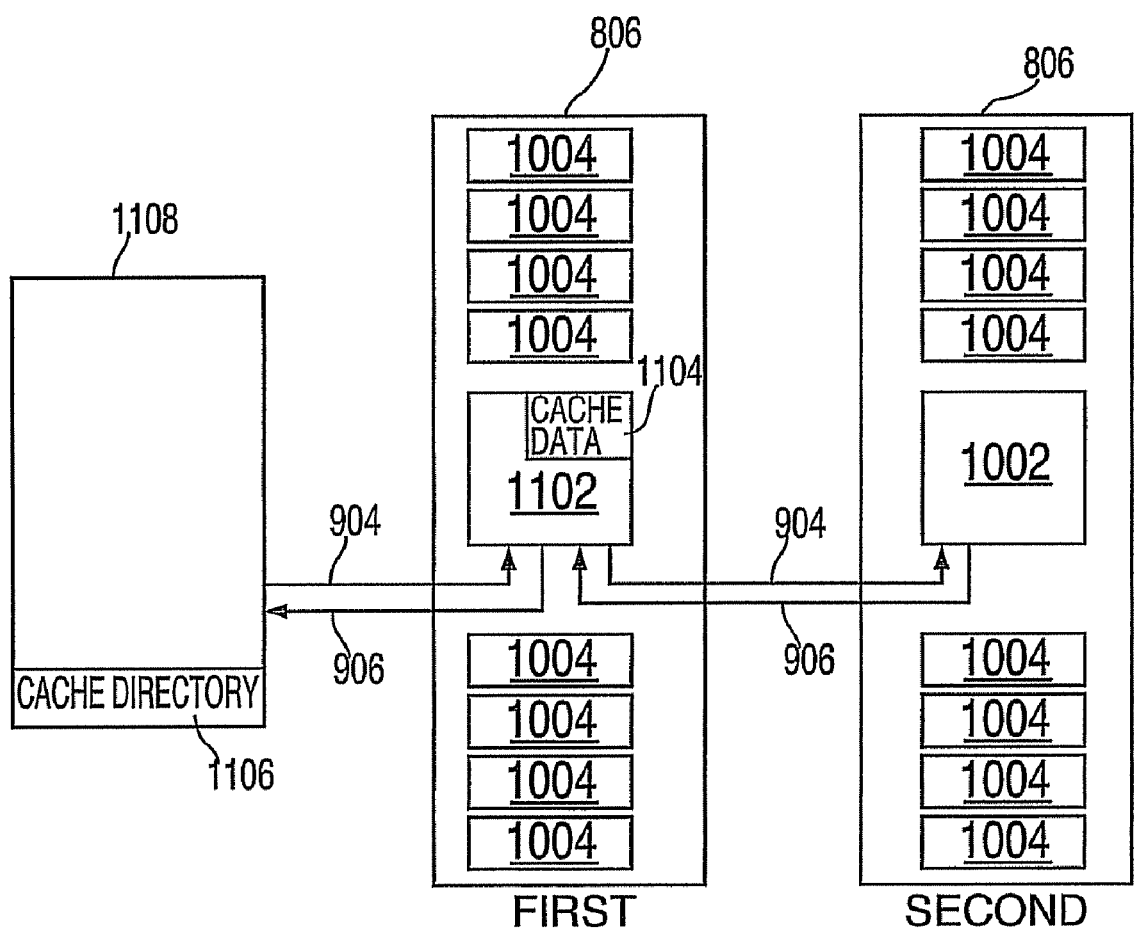
FIG. 11 depicts a memory structure with cached data that may be utilized by exemplary embodiments of the present invention.

FIG. 11 depicts a memory subsystem with cached data that may be utilized by exemplary embodiments of the present invention. The memory subsystem includes a memory controller 1108 with a cache directory 1106. The first memory module 806 (labeled in FIG. 11 as "first") connected to the memory controller 1108 includes a cache buffer device 1102 with cache data 1104. The second memory module 806 (labeled in FIG. 11 as "second") in the chain includes a buffer device 1002 as described previously herein. The cache buffer device 1102 operates in the same manner as the previously described buffer device 1002 with the addition of cache functions. Similarly, the memory controller 1108 depicted in FIG. 1 operates in the same manner as the previously described memory controller 802 with the addition of cache functions.

In the configuration depicted in FIG. 11, the cache directory 1106 is separately accessible by the memory controller 1108 because it is contained within the memory controller 802. Alternatively, the cache directory 1106 may be located externally to the memory controller 1108 but accessible by the memory controller 1108. Accesses to the cache data 1104 (also referred to in the art as "level 3 data" or "L3 data") are explicitly addressed by the memory controller 1108. As is known in the art, the latency of the cache reads will be less than the latency of reads to the memory devices 1004. In the exemplary configuration depicted in FIG. 11, the cache read latency is deterministically predetermined. The memory controller 1108 utilizes the information in the cache directory 1106 and the cache read latency to schedule collision free read traffic in the memory subsystem.

The cache buffer device 1102 may be located on one or more of the memory modules 806 within the memory subsystem depicted in FIG. 11. It may be located on the first memory module 806 and/or the second memory module 806. If the cache buffer device 1102 is set to "global" and located in the first memory module 806, then data from any of the memory modules 806 in the memory subsystem may be contained in the cache data 1104 and therefore referenced in the cache directory 1106. Alternatively, the cache buffer device 1104 may be located in the first memory module 806 and set to "local", which indicates that only data within the first memory module 806 will be contained in the cache data 1104 and referenced by the cache directory 1106. Both the first and second memory modules 806 may contain "local" cache buffer devices 1102 with cached data 1104 contents being reflected in the cache directory 1106. Further, the first and second memory modules 806 may contain cache buffer devices 1104 that are set to "global" and cache data from any of the memory modules 806 in the memory subsystem may be contained in either of the cache buffer devices 1102. The previous examples refer to a memory subsystem that contains two memory modules 806, the same principles may be applied to memory subsystems with any number of memory modules 806 (e.g., one, four, eight, etc.).

Figure 12:
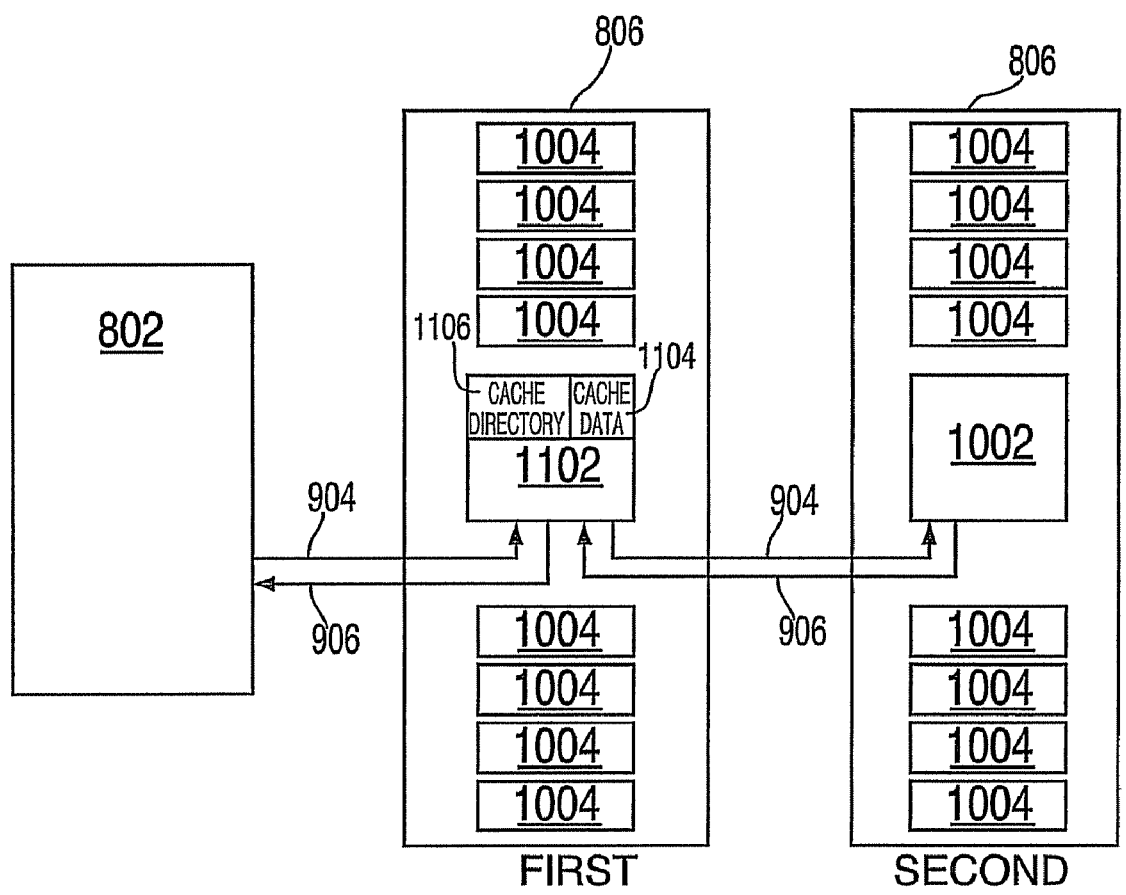
FIG. 12 depicts a memory structure with cached data that may be utilized by exemplary embodiments of the present invention.

FIG. 12 depicts an alternate memory subsystem with cached data that may be utilized by exemplary embodiments of the present invention. The first memory module 806 (labeled in FIG. 12 as "first") includes a cache buffer device 1102 set to "global" that contains cached data 1104 and the cache directory 1106. Because the memory controller 802 does not know the contents of the cache data 1104, it cannot predict the return time of the data associated with the read request (i.e., there is indeterminate read data latency). To support indeterminate read data latency, the first memory module 806 includes a read data tag signal on the upstream memory bus 906 that will tie a memory read request from the memory controller 802 to result data sent to the memory controller 802. An extra wire may be added to the upstream memory bus 906 between the first memory module 806 and the memory controller 802 to contain a bit associated with the read data tag signal. Alternatively, one or more existing wires on the upstream memory bus 906 may be utilized to support the read data tag signal. In an exemplary embodiment of the present invention, the read data tag signal is sent to the first memory module 806 on the downstream memory bus 904 via one or more existing wires in the downstream memory bus 904. For example, the read data tag signal for the downstream memory bus 904 may be created by combining the position of the memory module 806 in the chain with a sequence number.

If a cache buffer device 1102 is plugged into the memory module 806 in the first position of the memory channel (or memory subsystem) and the cache buffer device 1102 is set to "global", then the read data tag signal is utilized to identify which read request corresponds to the returning data. Memory read requests are issued by the memory controller 802 to the memory channel without knowledge of the cached status of the data at the requested address. If the requested address is found to be cached, then the data at the requested address will be returned immediately by the cache buffer device 1102, thus improving read data latency and system performance. If the requested address is not found in the cache, it will be returned from the main memory devices (e.g., SDRAMS 1004) with the standard read data latency. All memory addressable in the channel are potentially cached by the cache buffer device 1102 when the cache buffer device 1102 is located on a memory module 806 in the first position in the memory channel and the cache buffer device 1102 is set to "global."

In an alternate exemplary embodiment of the present invention, all memory modules 806 include the optional read data tag signal on their upstream controller interfaces (i.e., the upstream memory bus 906). Each segment (i.e., between each of the memory modules 806 and between the first memory module 806 and the memory controller 802) of the upstream memory bus 906 includes an extra bit for the read data tag signal or utilize an existing bit for the read data tag signal. Each segment will contain a read data tag in cases where the cache buffer device 1102 is set to "local" and will only operate on the memory addresses that reside on the local memory module 806. In addition, the read data tag may be utilized to perform data merging between data local to the memory module 806 and data being received via the upstream memory bus 906. The decoding of the read data tag and local data arbitration at each memory module 806 in the memory channel may add appreciable latency to all memory read operations. The added latency associated with this embodiment is more than the added latency associated with the previous embodiment where the read data tag signal is limited to the first memory module 806 in the chain.

Figure 13:
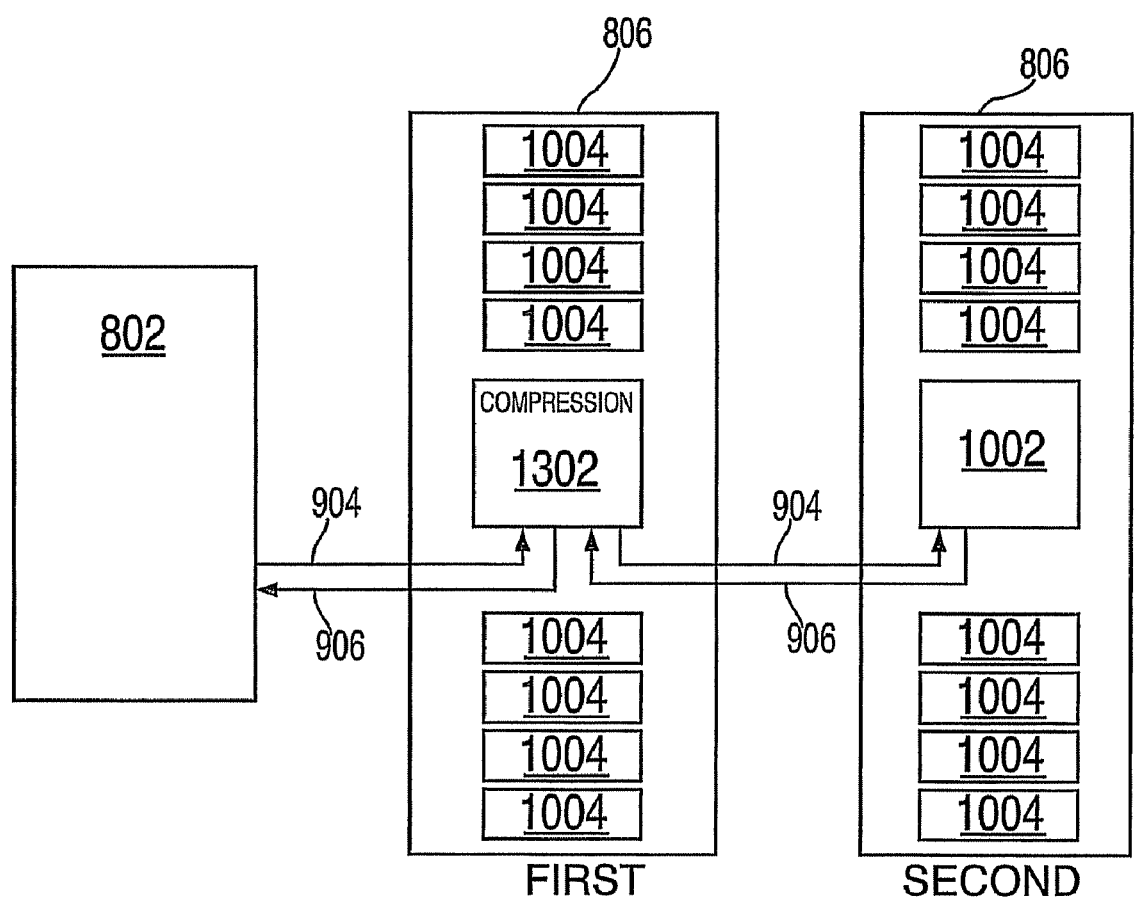
FIG. 13 depicts a memory structure with data compression that may be utilized by exemplary embodiments of the present invention.

FIG. 13 depicts a memory structure with data compression that may be utilized by exemplary embodiments of the present invention. Data compression is another enhanced feature that may be optionally added to the memory subsystems described herein. The compression buffer device 1302 includes logic macros that encode write data into a format that requires less space in the main memory devices (e.g., the SDRAMS 1004). A memory channel, or memory subsystem, with data compression will appear to have a much higher capacity than an uncompressed memory channel. When leveraged by the system, this additional effective capacity will result in increased performance as fewer pieces of data will need to be stored in the slower levels of system memory such as the hard disk drive. During read operations, memory data locations that have been compressed will typically take longer to retrieve from the memory channel due to the decompression time.

In exemplary embodiments, such as the one depicted in FIG. 13, the first memory module 806 includes an optional read data tag signal on the upstream controller interface (i.e., the upstream memory bus 906) to allow for indeterminate read data latency. If a compression buffer device 1302 is included in the first memory module 806 in the chain (i.e., the memory module labeled "first" in FIG. 13) and the compression buffer device 1302 is set to "global", then read data tag signal will be utilized. Memory read requests are issued to the memory channel by the memory controller 802 without knowledge of the compression status of the requested address. If the data at the requested address is determined to be compressed, the data at that address will be returned after decompression. The compression of data will result in improving effective channel memory capacity and system performance. If the data at the requested address is not compressed, the data at the requested address will be returned from the main memory devices (e.g., the SDRAMS 1004) with the standard read data latency. All data at memory addresses in the channel are potentially compressed when the compression buffer device 1302 is located in the first memory module 806 in the channel and the compression buffer device 1302 is set to "global."

In alternate exemplary embodiments of the present invention, the compression buffer device 1302 is located on one or more of the memory modules 806 and set to "local." In this case, all memory modules 806 include the optional read data tag signal on their upstream controller interfaces (i.e., the upstream memory bus 906). Each segment of the upstream memory bus 906 (i.e., between each of the memory modules 806 and between the first memory module 806 and the memory controller 802) includes an extra bit for the read data tag signal. Here, the compression buffer device 1302 will only operate on the memory addresses that reside on the local memory module 806. Decoding of the read data tag and local data arbitration at each memory module 806 in the memory channel may add appreciable latency to all memory read operations. The added latency associated with this embodiment is more than the added latency associated with the previous embodiment where the read data tag signal is limited to the first memory module 806 in the chain.

An alternate exemplary embodiment of the present invention includes a buffer device 1002 with the cache functions of the cache buffer device 1102 and the compression functions of the compression buffer device 1302. One, both or none of the cache functions and the compression functions may be activated for each memory module in the memory subsystem, thereby allowing for flexibility in memory subsystem configuration. Further, one or both of the cache buffer device 1102 and the compression buffer device 1302 may be located included on the first memory module and set to "global."

Figure 14:
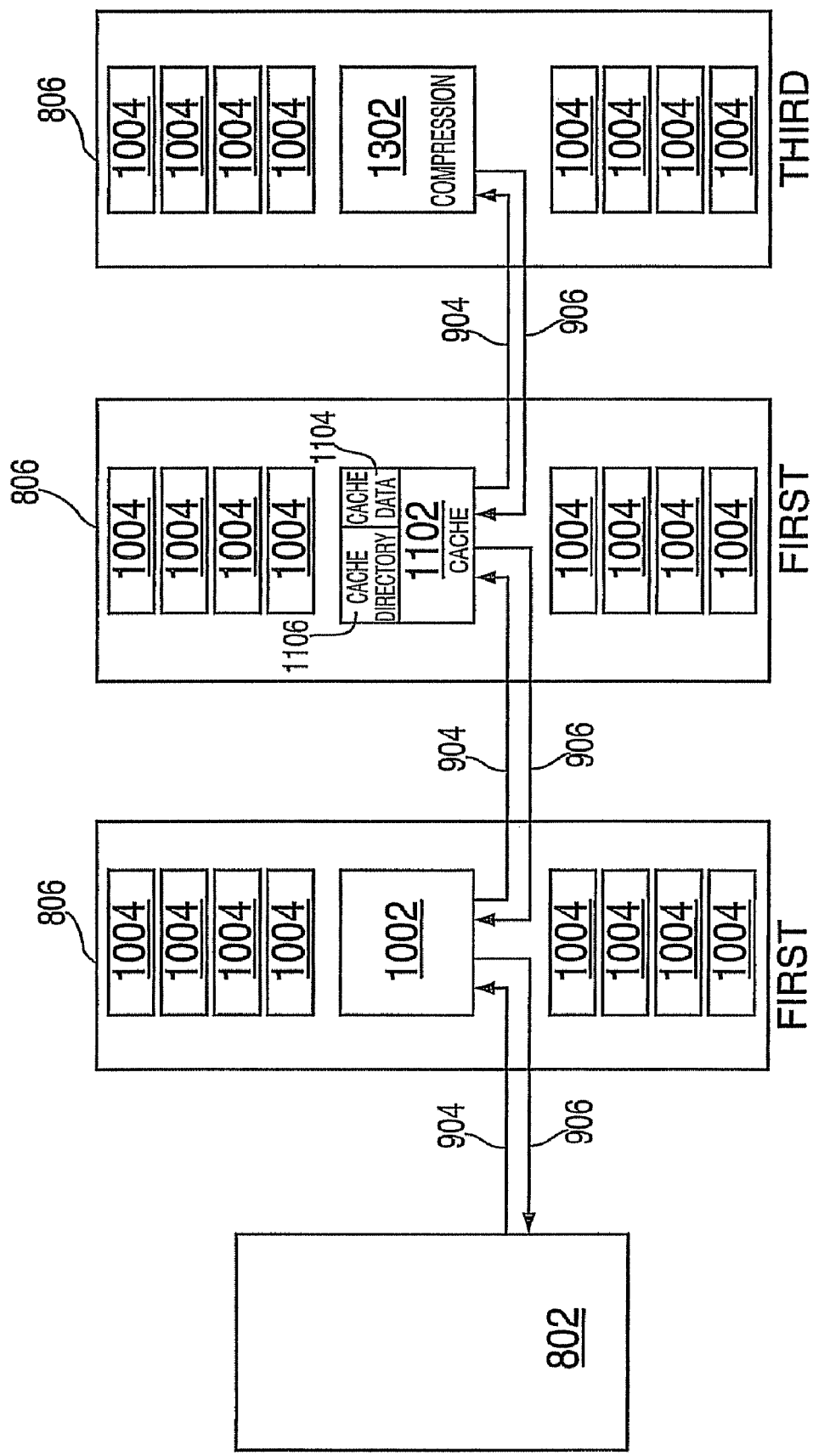
FIG. 14 depicts a memory structure with cached data and data compression that may be utilized by exemplary embodiments of the present invention.

FIG. 14 depicts a memory structure with cached data (on the memory module 806 labeled "second") and data compression (on the memory module 806 labeled "third") that may be utilized by exemplary embodiments of the present invention. Because the cache buffer device 1102 and compression buffer device 1302 are not located in the first memory module 806 (i.e., they are set to "local"), the read data tag is added to all segments of the upstream memory bus 906 to track the read commands in the memory subsystem. The caching performed by the cache buffer device is limited to data stored on memory devices (e.g., SDRAMS 1004) accessible by the second memory module 806. Similarly, the compression performed by the compression buffer device 1302 is limited to data stored on memory devices accessible by the third memory module 806.

Exemplary embodiments of the present invention may be utilized to improve the performance of the entire memory subsystem. Cache and/or data compression may be included in a buffer device 1002 in the first memory module 806 in the chain and apply to all data in the memory subsystem. If global caching is activated, then the cache buffer device 1102 in the first memory module 806 includes cache data for data that may be addressed by any of the memory modules 806 in the memory subsystem. Similarly, if global data compression is activated, then the compression buffer device 1302 in the first memory module provides data compression (and decompression) for data that may be addressed by any of the memory modules 806 in the memory subsystem Alternate exemplary embodiments of the present invention may be utilized to improve the performance of particular memory modules 806 within the memory subsystem. Local cache and/or data compression may be included in a buffer device 1002 in a selected memory module 806 and apply to data accessible by the selected memory module 806. In this manner, the performance for selected memory modules 806 may be improved by utilizing exemplary embodiments of the present invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A cascaded interconnect system comprising:
   a memory controller for generating data read requests, the controller operable with indeterminate data response times;
   one or more memory modules for processing the data read requests, each memory module including one or more memory devices, wherein at least one of the memory modules includes a data compression module for compressing and decompressing at least a subset of the data read from and written to at least a subset of the one or more memory devices;
   an upstream memory bus; and
   a downstream memory bus, wherein the memory modules and the memory controller are interconnected by a packetized multi-transfer interface via the downstream memory bus and the upstream memory bus, and data responses to the data read requests accessed via the data compression module include tag information to correlate the data responses to the data read requests.

2. The system of claim 1 wherein the upstream memory bus includes one or more wires for the tag information.

3. The system of claim 1 wherein the data compression module is located on a first memory module in the one or more memory modules and at least a subset of the data accessed via the data compression module is sourced from a memory device located on a second memory module in the one or more memory modules, the first memory module and the second memory module being different memory modules.

4. The system of claim 1 wherein at least one of the memory modules includes a cache.

5. A cascaded interconnect system comprising:
   a memory controller for generating read data requests, the controller operable with indeterminate data response times;
   one or more memory modules each including a plurality of corresponding memory devices, wherein at least one of the memory modules includes a data compression module for compressing and decompressing at least a subset of the data stored on the corresponding memory devices on the memory module;
   an upstream memory bus; and
   a downstream memory bus, wherein the memory modules and the memory controller are interconnected by a packetized multi-transfer interface via the downstream memory bus and the upstream memory bus, and the memory controller utilizes a read data tag on data read requests sent via the downstream memory bus and the read data tag on data return results received via the upstream memory bus to match the data read requests with the data return results.

6. The system of claim 5 wherein at least one of the one or more memory modules includes a data cache.

7. A method for providing data compression in a memory system, the method comprising:
   receiving a request at a selected memory module to read data at a specified data address, the request from a memory controller in a cascaded memory system and the selected memory module one of one or more memory modules included in the cascaded memory system;
   determining if the data is compressed;
   decompressing the data if it is determined to be compressed; and
   transmitting tag information along with the data to correlate the data to the request if the data was determined to be compressed.

8. The method of claim 7 wherein a data compression module for performing the decompressing is located on the selected memory module, the receiving a request includes receiving a read data tag associated with the request and the transmitting the data includes transmitting the read data tag.

9. The method of claim 7 wherein the selected memory module is in direct communication with the memory controller and data is sourced from the one or more memory modules.

10. The method of claim 7 wherein data in the data is sourced from the selected memory module.

11. The method of claim 7 wherein the selected memory module further includes a cache.

12. A storage medium encoded with machine readable computer program code for providing data caching in a memory subsystem, the storage medium including instructions for causing a computer to implement a method comprising:
   receiving a request at a selected memory module to read data at a specified data address, the request from a memory controller in a cascaded memory system and the selected memory module one of one or more memory modules included in the cascaded memory system;
   determining if the data is compressed;
   decompressing the data if it is determined to be compressed; and transmitting tag information along with the data to correlate the data to the request if the data was determined to be compressed.

13. The storage medium of claim 12 wherein a data compression module for performing the decompressing is located on the selected memory module, the receiving a request includes receiving a read data tag associated with the request and the transmitting the data includes transmitting the read data tag.

14. The storage medium of claim 12 wherein the selected memory module is in direct communication with the memory controller and data is sourced from the one or more memory modules.

15. The storage medium of claim 12 wherein data in the data is sourced from the selected memory module.

16. The storage medium of claim 12 wherein the selected memory module further includes a cache.

* * * * *